United States Patent [19]

Hayashi et al.

[11] Patent Number: 5,102,629
[45] Date of Patent: Apr. 7, 1992

[54] FIELD FORMATION APPARATUS

[75] Inventors: Atsushi Hayashi; Kiyoshi Shigeoka, both of Tokyo, Japan

[73] Assignee: Asahi Glass Company, Ltd., Tokyo, Japan

[21] Appl. No.: 683,129

[22] Filed: Apr. 10, 1991

Related U.S. Application Data

[63] Continuation of Ser. No. 462,957, Jan. 8, 1990, abandoned, which is a continuation of Ser. No. 222,254, Jul. 21, 1988, abandoned.

[30] Foreign Application Priority Data

Jul. 23, 1987 [JP] Japan ................................ 62-182248
Aug. 25, 1987 [JP] Japan ................................ 62-209215

[51] Int. Cl.$^5$ ................................ B01J 19/08; B01J 19/12
[52] U.S. Cl. ........................... 422/186.18; 422/186.07; 422/907
[58] Field of Search .................... 422/186.07, 186.18, 422/907; 204/290 R, 290 F

[56] References Cited

U.S. PATENT DOCUMENTS

| | | | |
|---|---|---|---|
| 3,899,685 | 8/1975 | Francis et al. | 422/186.07 |
| 4,051,045 | 9/1977 | Yamamoto | 422/186.07 |
| 4,203,821 | 6/1980 | Cramer et al. | 204/290 R |
| 4,212,725 | 7/1980 | Habermann et al. | 204/290 F |
| 4,234,405 | 11/1980 | Hesketh et al. | 204/290 F |
| 4,456,518 | 6/1984 | Bommaraju | 204/290 F |
| 4,456,519 | 6/1984 | Zöllner | 204/290 R |
| 4,618,404 | 10/1986 | Pellegri | 204/290 R |
| 4,690,803 | 9/1987 | Hirth | 422/186.18 |

FOREIGN PATENT DOCUMENTS

| | | |
|---|---|---|
| 8632118 | 3/1987 | Fed. Rep. of Germany . |
| 57-123805 | 8/1982 | Japan . |
| 5944782 | 3/1984 | Japan . |
| 6114103 | 1/1986 | Japan . |
| 6186403 | 5/1986 | Japan . |
| 62-148306 | 7/1987 | Japan . |
| 3085004 | 4/1988 | Japan ................................ 204/176 |

*Primary Examiner*—Robert L. Stoll
*Assistant Examiner*—Philip Tucker
*Attorney, Agent, or Firm*—Oblon, Spivak, McClelland, Maier & Neustadt

[57] ABSTRACT

A field formation apparatus comprising a pair of electrodes for electric field formation, wherein at least the surface of at least one of the electrodes is made of electrical conductive ceramics containing at least 30% by voluem of at least one member selected from the group consisting of borides, carbides and nitrides of transition metals of Groups IVa and Va of the Periodic Table.

13 Claims, 1 Drawing Sheet

AC high voltage power source

AC high voltage power source

FIELD FORMATION APPARATUS

This application is a continuation of application Ser. No. 07/462,957, filed on Jan. 8, 1990, now abandoned, which is a continuation of Ser. No. 07/222,254, filed July 21, 1988, now abandoned.

The present invention relates to a field formation apparatus. More particularly, it relates to a field formation apparatus comprising electrodes made of electrical conductive ceramics and an ozonizer wherein such a field formation apparatus is used.

A field formation apparatus usually comprises a pair of electrodes facing each other with a suitable distance, whereby an electric field is formed between the electrodes by applying a direct current voltage or an alternating current voltage between the two electrodes. With respect to the structure, various types have been known depending upon the particular purposes. For example, a pair of main electrodes face each other as in the case of a sputtering apparatus or a plasma generator; dielectrics is provided between electrodes for the purpose of generating silent-discharge; or Japanese Unexamined Patent Publication No. 44782/1984 proposes a structure for generating surface-discharge. The material for electrodes in these apparatus is usually a metal. For example, stainless steel, copper, nickel, tungsten, etc. are used in various forms.

Further, Japanese Unexamined patent Publication No. 123805/1982 discloses electrodes made of SiC, and Japanese Unexamined Patent Publication No. 148306/1987 proposes to use $LaB_6$ for ozonizer electrodes.

It has been common that electrodes for conventional field formation apparatus are made of metals because of the necessity of electrical conductivity. However, when an electric field is to be formed constantly, various problems have been known. In the case of stainless steel or copper, the durability is low when an electric field is formed, and a discharge phenomenon takes place, although they are excellent in the processability. For example, in the case of a sputtering apparatus or a plasma generator, when the electrodes are attacked by plasma particles, it is likely that metal particles sputter from the electrodes or a reaction takes place to deteriorate the surface condition of the electrodes, whereby the field characteristics will be changed, or sputtered metal particles will contaminate the atmosphere and thus create a problem as impurities depending upon the step. Tungsten and molybdenum are regarded as preferred electrode materials, since they have high melting points and are stable in vacuum. For example, in Japanese Unexamined Patent Publication No. 14103/1986 or No. 86403/1986, it is proposed to use them as electrodes for an ozonizer. However, tungsten and molybdenum are readily oxidizable metals, and when used as electrodes for an ozonizer, they are readily oxidized by ozone or by ionized oxygen generated in the electric field, whereby the electrode properties are likely to deteriorate, or the formed oxides are likely to be included as impurities for the subsequent step.

Japanese Unexamined Patent Publication No. 123805/1982 proposes electrodes made of SiC. Although SiC has high corrosion resistance, the electrical conductivity is low, and it is not necessarily suitable as electrode material. Especially for the purpose of the present invention, this material is not suitable since the object as a field formation apparatus of the present invention can not thereby be accomplished.

Further, Japanese Unexamined Patent Publication No. 148306/1987 proposes $LaB_6$ as electrodes for an ozonizer. However, $LaB_6$ has a high vapor pressure. Accordingly, when the discharge current density increases, the temperature at the discharge portion becomes high, and evaporation becomes vigorous, thus leading to contamination of the atmosphere and a deterioration of the electrode surface. Japanese Unexamined Patent Publication No. 148306/1987 proposes to fix $LaB_6$ powder by glass frit. However, by this method, it is hardly possible to obtain an electrical conductivity suitable for electrodes ($10^3 \Omega^{-1} cm^{-1}$).

Now, the background of the ozonizer as the most preferred embodiment of the present invention will be described in further detail.

Various types of ozonizers have been proposed, and some of them have been practically in use. Most common as a method of utilizing electric discharge is a method wherein dielectrics is provided between electrodes and an alternate current high voltage is applied to utilize silent-discharge. In this method, $O_2$ is oxidized to $O_3$ at a space between the electrodes and the dielectrics. Whereas, in the surface-discharge method proposed in Japanese Unexamined Patent Publication No. 14103/1986, dielectrics and electrodes are integrally formed, whereby $O_3$ is formed on the surface of the dielectrics in the vicinity of the electrodes. The electrode material is usually a metal in most cases. For example, stainless steel, copper, nickel and tungsten are considered to be useful. As mentioned above, Japanese Unexamined Patent Publication No. 123805/1982 proposes SiC and Japanese Unexamined Patent Publication No. 148306/1987 proposes $LaB_6$, as a ceramics electrode.

With metal electrodes used in such conventional ozonizers, metal sputtering from the electrodes are likely to take place upon electric discharge, thus leading to contamination of the atmosphere or a deterioration of the electrodes. Especially in the field of semiconductor industry, the oxidizing effect of ozone has been used in recent years for washing semiconductor substrates or for ashing treatment of resist films, and metals sputtered from the electrodes are likely to cause contamination of circuits formed on the semiconductor substrate. From such a viewpoint, Japanese Unexamined Patent Publication No. 123805/1982 proposes SiC as electrodes. However, SiC has a low electrical conductivity, whereby the power efficiency will be low as compared with other electrodes having a high electrical conductivity, and the heat generation tends to increase. Japanese Unexamined Patent Publication No. 148306/1987 proposes electrodes made of $LaB_6$. However, in recent years, it is desired to increase the discharge current density to meet the requirements for the generation of highly concentrated ozone and for scaling down the apparatus, and under such conditions, evaporation can not be negligible with $LaB_6$ having a relatively high vapor pressure.

None of conventional apparatus is adequate to meet the requirements for high concentration of generated ozone, scaling down of the apparatus and long useful life of the apparatus.

It is an object of the present invention to solve the above-mentioned problems relating to conventional electrodes for electric field formation and to provide electrodes capable of efficiently forming a constant electric field.

Another object of the present invention is to solve the problems relating to conventional ozonizers and to provide an ozonizer capable of meeting the requirements for scaling down and long useful life of the apparatus, high concentration of generated ozone and high efficiency for the generation of ozone. The present invention provides a field formation apparatus comprising a pair of electrodes for electric field formation, wherein at least the surface of at least one of the electrodes is made of electrically conductive ceramics containing at least 30% by volume of at least one member selected from the group consisting of borides, carbides and nitrides of transition metals of Groups IVa and Va of the Periodic Table.

Figure 1:
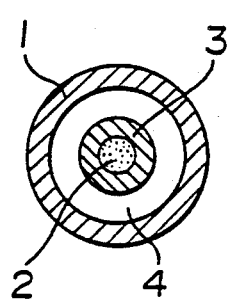
FIG. 1 is a cross sectional view of an apparatus of the present invention taken perpendicular to the longitudinal direction thereof.
Figure 2:
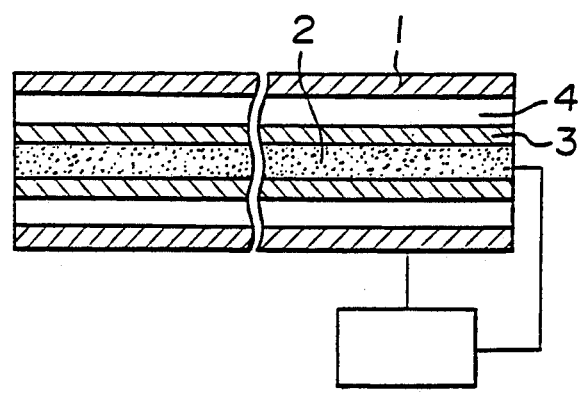
FIG. 2 is a cross sectional view of the same apparatus taken along the longitudinal direction thereof with a part thereof omitted.

In the drawings, reference numeral 1 designates an outer electrically conductive ceramic electrode, numeral 2 designates an inner electrical conductive ceramics electrode, numeral 3 indicates dielectrics, and numeral 4 indicates a space for the introduction of gas.

Now, the present invention will be described in detail, particularly with reference to the application to an ozonizer.

In the field formation apparatus of the present invention, electrical conductive ceramics containing at least 30% by volume of at least one member selected from the group consisting of borides, carbides and nitrides of transition metals of Groups IVa and Va of the Periodic Table, is used as the electrical conductive ceramics for the electrodes for electric field formation, and it is important to use such ceramics. These compounds are readily available as a material having an electrical conductivity of from $10^4$ to $10^5 \Omega^{-1} cm^{-1}$, and they exhibit electrical conductivity having no problem as electrodes. The electrical conductivity of the electrical conductive ceramics suitable for the apparatus of the present invention is preferably at least $10^3 \Omega^{-1} cm^{-1}$ at 20° C. As is evident from the crystal structure, the electrical conductive ceramics has covalent bonds, whereby the damage due to electrons or particles in the electric field is substantially less than a metal having metal bonds only. Further, the chemical stability of such ceramics is higher than a metal, and it is durable against oxidation or corrosion and is hardly deteriorated. Thus, the field formation apparatus of the present invention is capable of forming a required electric field constantly for a long period time under various conditions and capable of preventing such problems as contamination of the atmosphere and inclusion of impurities.

At the same time, since the damage is less during the electric field formation, a compact design for the same performance is possible as compared with metal electrodes, whereby it is possible to realize scaling down of the apparatus.

In addition, the above-mentioned compounds usually have a discharge electron density substantially higher than that of metals. Therefore, they are most suitable for electrodes providing a very high discharge current density.

As is evident from the foregoing description, it is possible to obtain by the present invention a compact high performance ozonizer having a long useful life, which is capable of generating highly concentrated ozone with high efficiency as compared with conventional apparatus and which is free from inclusion of contaminants in the generated ozone.

The electrically conductive ceramics may contain not more than 70% by volume of other components such as sintering aids or other ceramics or metals to be incorporated to reduce the costs. If such other components exceed 70% by volume, the above-mentioned effects rapidly decrease. To obtain adequate effects, it is preferred that at least one of borides, carbides and nitrides of transition metals of Groups IVa and Va of the Periodic Table is at least 60% by volume, more preferably at least 80% by volume, to obtain even better effects.

Such electrically conductive ceramics which makes the apparatus of the present invention possible will be described in further detail as follows.

Firstly, specific metals suitable for use include Zr, Ti and Hf of Group IVa and Ta, Nb and V of Group Va. Their borides, carbides and nitrides are used as the ceramics material.

Among them, particularly preferred are borides and carbides of metals of Groups IVa and Va, such as $ZrB_2$, $TiB_2$, $TaB_2$, $ZrC$, $TiC$, $HfC$, $TaC$, $NbC$ and $NbB_2$.

These materials have an electrical conductivity of at least $10^4 \Omega^{-1} cm^{-1}$ and are thus suitable as electrodes, and they have a melting point of at least 3000° C. and are thus excellent in the discharge resistance. Further, their chemical stability is very high as compared with metals, and they not only are superior in the durability to conventional electrode materials, but also make it possible to use them under severe conditions. Further, their electron densities are higher than those of metals.

Preferred as a nitride is ZrN or HfN. As compared with the above compounds, such a nitride is inferior in the oxidation resistance and deteriorates quickly when used in the presence of oxygen. However, in an inert atmosphere, particularly in a nitrogen atmosphere, it is stable and provides excellent effects as the melting point is high.

As such electrical conductive ceramics electrodes useful for the field formation apparatus of the present invention, the electrodes per se may be made of a sintered product of ceramics, or they may have a structure such that the main bodies of the electrodes are, made of a metal and a coating of prescribed electrically conductive ceramic is formed on their surface. In other words, the electrodes may be such that at least the surface thereof is made of the electrical conductive ceramics.

For the formation of such electrodes, various methods may be employed depending upon the particular apparatus. Firstly, as a most common method, a powder sintering method may be mentioned. This method is employed mainly for the preparation of bulk electrodes. This method is most suitable especially when a certain degree of strength is required in addition to the electrode properties. For the formation of a thin film electrode essential for scaling down, for light weight formation or for hybrid formation of the apparatus, CVD, PVD or a coating method such as plasma spray coating may be employed. The coating method varies depending upon the particular purpose. For instance, a method of coating on a metal electrode or a method of forming a coating layer on an insulating material, may be employed.

Thus, it is essential in the present invention to use a certain specific electrical conductive ceramics as electrodes. Various manners are available for the use of such electrodes. For example, in order to form an electric field, a high voltage is supplied between a pair of electrodes to cause electric discharge between the electrodes. In the present invention, it is preferred that both electrodes are made of the above-mentioned specific electrical conductive ceramics.

It is of course possible that only one of the electrodes is made of the specific electrical conductive ceramics. In such a case, it is preferred that the discharge electrode is made of the electrical conductive ceramics. This is because the discharge electrode will have a discharge current density higher than that of the induction electrode. Particularly in the case of an ozonizer, ozone is generated at the discharge electrode side, and the discharge electrode is more susceptible to oxidation.

With respect to the shapes and arrangements of electrodes, flat electrodes of plate-like or strip-like shape may be arranged to face each other in a usual manner. However, a special mode may be adopted. For example, it is possible to adopt stick electrodes or spherical electrodes.

When the present invention is applied to an ozonizer or an ozone generating method, the electrodes are preferably used in the form of cylinders.

Now, the present invention will be described in detail with reference to this preferred embodiment.

Namely, it is an ozonizer having a concentric structure with two electrodes arranged to form a space therebetween for silent dischage, wherein at least one of the electrodes is made of electrical conductive ceramics containing at least 30% by volume of at least one member selected from the group consisting of borides, carbides and nitrides of transition metals of Groups IVa and Va of the Periodic Table.

The concentric structure with the two electrodes arranged to form a space is coupled with the use of the specific electrical conductive ceramics electrodes to present an important contribution to the realization of a compact apparatus.

Namely, as compared with a parallel flat plate-like structure, the effective electrode area per unit volume is large. Since the separation from the outer atmosphere can be made by the outer electrode, the ozone generating portion other than the power source portion and the gas supplying portion can be scaled down to the size of the electrodes. Even when such a scaling down design is possible, if a conventional metal is used for electrodes, the generation capacity will be restricted by the electrode properties. Therefore, in the present invention, this problem has been solved by using the specific electrical conductive ceramics for the electrodes.

Various embodiments are possible for the concentric structure of the electrodes for the apparatus of the present invention, and they will now be described.

In an apparatus of the present invention, at least two electrodes are arranged concentrically to form a space therebetween, whereby at least the outer electrode is required to be cylindrical.

Whereas, the inner electrode may not necessarily be cylindrical (hollow) and may be a solid body (rod).

In this apparatus, at least one of these electrodes may be made of the electrical conductive ceramics which will be described hereinafter. Various embodiments are possible. Some of the preferred embodiments are as follows.

(1) Both electrodes are made of the electrical conductive ceramics.

(2) At least the electrode surfaces facing the space (where $O_2$ or air is introduced) are made of the electrical conductive ceramics.

(3) The electrode surface of the outer cylindrical electrode facing the space is made of the electrical conductive ceramics.

As is evident from the foregoing reasons, the embodiment (1) is an embodiment whereby the highest durability is obtainable. By the embodiment (2), the corrosion resistance against ozone can be secured by making the electrode surfaces facing the space where ozone is generated, by the electrical conductive ceramics. The embodiment (3) is advantageous for the same reason as of the embodiment (2) in the case of a structure wherein the feed gas is supplied between the outer electrode and dielectrics.

Several embodiments are available for the preparation of the electrodes made of electrically conductive ceramic. Typical methods are as follows.

(1) The electrodes per se are made of a sintered product of electrically conductive ceramic.

(2) The specific electrically conductive ceramic of the present invention is coated on a substrate (optional substrate made of conductive or dielectric material) to obtain electrodes.

In the case of (1), electrodes may be worked into various shapes with a merit that discharge working can be employed, and the electrodes can have adequate strength by themselves. The method (2) is rather limited in its range of application, but it is advantageous when scaling down is intended.

Further, in a typical advantageous structural embodiment for an ozonizer of the present invention, cylindrical dielectrics is provided between such electrodes, whereby the stability in the generation of ozone by electrical discharge can be improved. This is necessary especially in the case where silent-discharge is utilized.

From the foregoing, the most preferred embodiments are the following three.

(1) An apparatus comprising an outer cylindrical electrode made of a sintered product of the specific electrically conductive ceramic or having a coating of the specific electrical conductive ceramics formed inside thereof and an electrode comprising an outer dielectric and a core made of a sintered product of the specific electrical conductive ceramics concentrically provided with a space inside of the outer cylindrical electrode.

(2) An apparatus comprising the same outer cylindrical electrode as mentioned above and an electrode comprising dielectrics and a metal electrode provided concentrically with a space inside the outer cylindrical electrode.

(3) An apparatus wherein at least one of the two electrodes is made of a sintered product of the specific or made to have a coating layer of such ceramics, and a cylindrical dielectrics is provided at an intermediate portion between these electrodes with a space from the surface of each of the two electrodes.

Such structures of the apparatus of the present invention, as coupled with the use of the specific electrically conductive ceramic as described hereinafter, make scaling down possible as one of the objects of the present invention. The degree of the scaling down is for example as follows.

For example, by using concentric electrodes made of specified by the present invention, as compared with the use of concentric electrodes made of a metal, the diameter of cross section (usually circular) perpendicular to the longitudinal direction thereof can easily be made one half or less, and the length in the longitudinal direction of the electrodes can easily be made one half or less. Specifically, the diameter can be made to be 20 mm or less, and the length can easily be made to be 300 mm or less or possibly be 50 mm or less.

According to the present invention, various problems inherent to the conventional electrodes can be solved by using the specific electrical conductive ceramics for the electrodes for the field formation apparatus. The apparatus of the present invention is superior to the conventional apparatus in the charge resistance, heat resistance, corrosion resistance and oxidation resistance, and thus is capable of forming a required electric field constantly for a long period of time and also capable of preventing problems such as contamination of the atmosphere or inclusion of impurities. Further, the damage during the electric field formation is substantially less, and it is possible to increase the capacity of the apparatus or to make the apparatus compact. Further, the ceramics has a discharge electron density much higher than metals and is therefore most suitable as electrodes for an apparatus which provides a very high discharge current density.

A field formation apparatus is used in various fields. By using the specific electrical conductive ceramics as the electrodes, a substantial improvement in the performance over the conventional electrodes can be obtained. Thus, the industrial value of the present invention is significant.

Especially when the present invention is used for the generation of ozone, it is possible to obtain a compact and high performance ozonizer having a long useful life which is capable of generating highly concentrated ozone with high efficiency as compared with the conventional ozonizers and which is substantially free from the deterioration of electrodes even when the power density is increased and is free from contamination of the generated ozone. Such an apparatus is most suitable for use not only in the fields of water treatment, food processing and biological and medical treatment wherein the sterilizing, a deodoring or decoloring effects of ozone are utilized, but also in the field of the production of semiconductors to which attention has been drawn in recent years.

Now, the present invention will be described in further detail with reference to Examples. However, it should be understood that the present invention is by no means restricted by such specific Examples.

EXAMPLE 1

Plasma generator

In a plasma CVD apparatus for forming a predetermined coating layer (tungsten silicide) on a substrate (silicone) by generating a plasma under reduced pressure (at most a few tens torr), CVD treatment was conducted by using the electrical conductive ceramics (density: 5.0–14.0 g/cm$^3$, electrical conductivity: $10^4$–$10^5 \Omega^{-1} cm^{-1}$) as shown in Table 1 as parallel flat plate electrodes (50 mm×t5 mm) for providing a high-frequency high-voltage (5 kW/13.56 MHz). (The feed gas used was silane and tungsten hexafluoride, and hydrogen was used as the carrier, and the total flow rate was 50 ml/min.)

The change with time of the inclusion of the impurities to the coating layer and the surface condition of the electrodes used were compared. The results are shown in Table 1.

TABLE 1

| Electrode material | | Electrical conductive ceramics (% by volume) | | | | | Comparative Examples | |
|---|---|---|---|---|---|---|---|---|
| | | TaB$_2$ 80 | NbB$_2$ 80 | TaC 80 | ZrN 80 | HfN 80 | SUS 304 | SS 41 |
| Amount of impurities included in the coating layer* (Number of atoms/cm$^3$) | At start up | $10^{14}$ or less | $10^{14}$ or less | $10^{14}$ or less | $10^{14}$ or less | $10^{14}$ or less | $10^{15}$ to $10^{16}$ | $10^{18}$ to $10^{20}$ |
| | After 100 hrs | $10^{14}$ or less | $10^{14}$ or less | $10^{14}$ or less | $10^{14}$ to $10^{15}$ | $10^{14}$ to $10^{15}$ | $10^{17}$ to $10^{18}$ | $10^{21}$ |
| Surface condition after 100 hours of use | | No substantial change from the condition at the start up | | | | | Color changed and surface roughened | Severely corroded |

*The impurities were measured by charged particle activation analysis.

EXAMPLE 2

Ozonizer

Dielectrics (sintered product of Al$_2$O$_3$ having a purity of 99.5%, thickness 2 mm) was disposed between a pair of electrodes of parallel flat plate shape (20 mm×50 mm×3 mm) cooled with water, and silent-discharge (5 kW, 50 Hz) was generated. Pure oxygen was supplied between the electrodes, whereby the yield of ozone was measured. The results are shown in Table 2 together with the results of the observation of the surface condition of the electrodes used.

TABLE 2

| Electrode material | | Electrical conductive ceramics (% by volume) | | | | | Comparative Examples | | | |
|---|---|---|---|---|---|---|---|---|---|---|
| | | ZrB$_2$ 90 | TiC 90 | TiB$_2$ 90 | NbC 90 | HfN 90 | SUS | W | SiC*[1] | LaB6*[2] |
| Yield of ozone (g/Kwh) | At start up | 185 | 200 | 190 | 178 | 181 | 110 | 140 | 85 | 180 |
| | After | 188 | 198 | 191 | 170 | 179 | 35 | 65 | 78 | 140 |

TABLE 2-continued

| Electrode material | Electrical conductive ceramics (% by volume) | | | | | Comparative Examples | | | |
|---|---|---|---|---|---|---|---|---|---|
| | ZrB$_2$ 90 | TiC 90 | TiB$_2$ 90 | NbC 90 | HfN 90 | SUS | W | SiC*[1] | LaB6*[2] |
| 300 hrs Surface condition after 100 hours of use | No substantial change from the condition at the start up | | | | | Oxidized | Severely oxidized and roughened | Changes detected by SEM | |

*[1] SiC is a sintered product obtained by pressureless sintering.
*[2] LaB$_6$ is a product obtained by sintering the powder mixed with glass frit at 900° C.

EXAMPLE 3

Sputtering apparatus

As electrodes for a high-frequency sputtering apparatus, the ZrB$_2$-type electrical conductive ceramics as shown in Table 3 was coated on the surface of stainless steel plates in a thickness of from 50 to 500 μm by plasma spray coating. By using these electrodes, a SnO$_2$ layer was formed by sputtering in a thickness of 5000 Å on a substrate (glass) under the conditions of 13.65 MHz, from 100 to 500 W, Ar from $10^{-3}$ to $10^1$ Torr and at a substrate temperature of at least 300° C.

Further, the same electrical conductive ceramics was spray-coated also on an inner all of a vacuum tank. The amount of impurities included in the formed layer and the discharge condition are shown in Table 3.

TABLE 3

| Electrode material | Electrical conductive ceramics (% by volume) | | | | | SUS |
|---|---|---|---|---|---|---|
| | ZrB$_2$ 95 | ZrB$_2$ 70 | ZrB$_2$ 35 | ZrB$_2$ 20 | HfB$_2$ 90 | |
| Amount of impurities included in the coating layer (Number of atoms/cm$^3$) | $10^{14}$ or less | $10^{14}$ to $10^{15}$ | $10^{15}$ to $10^{16}$ | $10^{17}$ to $10^{18}$ | $10^{14}$ or less | $10^{18}$ to $10^{19}$ |
| Discharge condition after 1000 hrs of use | Good | Good | Good | Non-uniform | Good | Non-uniform |

EXAMPLES 4 to 8

Ozonizers

EXAMPLE 4

An electrode apparatus as shown in FIG. 1 was prepared.

Outer cylinder (outer electrode) 1

Shape: Length 150 mm, outer diameter 10 mm, inner diameter 8 mm
Material: ZrB$_2$ sintered product (ZrB$_2$: 90% by volume, SiC: 10% by volume or less)
Physical properties:
  Density 5.6 (g/cm$^3$)
  Electrical conductivity (20° C.)
  $10^5 \Omega^{-1} cm^{-1}$ Core inner electrode (2)

Shape: (Rod) Length 150 mm, diameter 4 mm
Material: ZrB$_2$ sintered product (ZrB$_2$: 90% by volume, SiC: 10% by volume or less)
Physical properties:
  Density 5.6
  Electrical conductivity (20° C.)
  $10^5 \Omega^{-1} cm^{-1}$ Dielectrics 3

Shape: Length 155 mm, outer diameter 7 mm, inner diameter 4 mm
Material: Alumina sintered product (Al$_2$O$_3$: 92% by weight, SiO$_2$: 8% by weight or less)
Physical properties:
  Density 3.8
  Dielectric constant 8.0 (1 MHz)
  Resistivity > $10^{14} \Omega$cm (20° C.)

By using such an apparatus, an alternate current high voltage (1 KHz, 10 KV) was applied between the inner and outer electrodes 1 and 2, and pure oxygen was supplied to a space 4 at a rate of 1 liter/min from one side of the cylinder, whereby ozone was generated at an ozone concentration of 10,000 ppm. Continuous operation was conducted for 1,000 hours while cooling with air the outer electrode, whereby no change was observed in the concentration of the generated ozone or in the electrode surface condition.

EXAMPLE 5

The operation was conducted under the same conditions as in Example 4 except that a metal electrode was used as the core 2. Even after continuous operation for 1,000 hours, the generation of ozone at a concentration of 10,000 ppm was obtained. No change was observed in the electrode surface conditon after the operaiton.

EXAMPLE 6

Tests were conducted in the same manner as in Example 4 except that the outer electrode and the, inner electrode were changed to an electrically conductive ceramic made of a sintered product containing 90% by volume of TiC, a sintered product of 90% by volume of TaC and a sintered product containing 90% by volume of NbB$_2$, respectively, whereby substantially the same results as in Example 4 were obtained.

EXAMPLE 7

Tests were conducted in the same manner as in Example 4 except that the outer electrode and the inner electrode were changed to electrically conductive ceramic sintered products having different $ZrB_2$ contents as shown in below, whereby the results were as follows.

| $ZrB_2$ content (% by volume) | Electrical conductivity (20°) | Generated amount after 10 hours of continuous operation |
|---|---|---|
| 70% | $8 \times 10^4 \, \Omega^{-1}cm^{-1}$ | No change |
| 40% | $8 \times 10^4 \, \Omega^{-1}cm^{-1}$ | 10% down |
| 20% | $7 \times 10^4 \, \Omega^{-1}cm^{-1}$ | 60% down |

(In the case where the $ZrB_2$ content was 20%, electrical discharge started to be non-uniform upon expiration of about 600 hours of continuous operation, and it was impossible to conduct stabilized operation thereafter.)

COMPARATIVE EXAMPLE

Tests were conducted in the same manner as in Example 4 except that the outer electrode and the core electrode were changed to other electrical conductive materials as shown below, whereby the results were as shown below.

|  | SiC electrode | $LaB_6$ electrode | Metal electrode (stainless steel) |
|---|---|---|---|
| Initial | 5,000 ppm | 10,000 ppm | 9,000 ppm |
| After 1000 hours | 4,000 ppm | 7,000 ppm | 600 ppm |
| Surface condition | No substantial change | Surface slightly whitened | Surface oxidized |

We claim:

1. An ozonizer for the generation of ozone in the gaseous state, comprising a pair of electrodes for electric field formation separated by a dielectric wherein at least a surface of at least one of the electrodes is made of an electrically conductive ceramic containing at least 30% by volume of at least one member selected from the group consisting of borides, carbides and nitrides of transition metals of Group IVA and VA of the periodic table in a space for the introduction of oxygen gas therein between the electrodes, the ozone which is generated coming into physical contact with said electrode made of an electrically conductive ceramic, and said ozonizer generating ozone by electron discharge between the pair of electrodes powered by an A.C. power source.

2. The ozonizer of claim 1, wherein the electrically conductive ceramic contains at least 60% by volume of at least one member selected from the group consisting of borides, carbides and nitrides of said transition metals.

3. The ozonizer of claim 1, wherein the electrically conductive ceramic is formed of at least one member selected from the group consisting of borides and carbides of said transition metals.

4. The ozonizer of claim 1, wherein said electrically conductive ceramic is formed of at least one member selected from the group consisting of $ZrB_2$, $TiB_2$, $TaB_2$, ZrC, TiC, HfC, TaC, NbC and $NbB_2$.

5. The ozonizer of claim 1, wherein said electrically conductive ceramic is ZrN or HfN.

6. The ozonizer of claim 1, wherein said electrodes are formed of a sintered product of said electrically conductive ceramic.

7. The ozonizer of claim 1, wherein said electrodes have a coating of electrically conductive ceramic on their surfaces.

8. The ozonizer of claim 1, wherein the electrically conductive ceramic has an electrical conductivity of at least $10^3 \Omega^{-1}cm^{-1}$.

9. The ozonizer of claim 1, wherein the surfaces of both electrodes are formed of said electrically conductive ceramic containing at least 30% by volume of at least one member selected from the group consisting of borides, carbides, and nitrides of said transition metals.

10. The apparatus for the generation of ozone according to claim 1, wherein the pair of electrodes have a concentric structure with a space therebetween, and a cylindrical dielectric is provided between the pair of electrodes.

11. The apparatus according to claim 10, wherein the inner side of the outer cylindrical electrode facing the inner space is made of said electrically conductive ceramic.

12. The apparatus according to claim 10, wherein the circular cross-sectional shapes have a diameter of not more than 20 mm.

13. The apparatus according to claim 10, wherein the length of the electrodes is not more than 30 cm in the longitudinal direction.

* * * * *